(12) United States Patent
Duller

(10) Patent No.: US 8,352,955 B2
(45) Date of Patent: Jan. 8, 2013

(54) PROCESS PLACEMENT IN A PROCESSOR ARRAY

(75) Inventor: Andrew William George Duller, Bristol (GB)

(73) Assignee: Mindspeed Technologies U.K., Limited, Bath (GB)

( * ) Notice: Subject to any disclaimer, the term of this patent is extended or adjusted under 35 U.S.C. 154(b) by 968 days.

(21) Appl. No.: 12/368,836

(22) Filed: Feb. 10, 2009

(65) Prior Publication Data

US 2009/0210881 A1 Aug. 20, 2009

(30) Foreign Application Priority Data

Feb. 11, 2008 (GB) .................................. 0802530.6

(51) Int. Cl.
*G06F 9/455* (2006.01)
*G06F 9/46* (2006.01)

(52) U.S. Cl. ....................................................... 718/105

(58) Field of Classification Search .................. None
See application file for complete search history.

(56) References Cited

U.S. PATENT DOCUMENTS

| | | | | | |
|---|---|---|---|---|---|
| 5,247,694 | A | * | 9/1993 | Dahl | ................................ 712/13 |
| 6,360,259 | B1 | | 3/2002 | Bradley | |
| 7,342,414 | B2 | * | 3/2008 | DeHon et al. | ................... 326/41 |
| 2007/0220522 | A1 | | 9/2007 | Coene et al. | |

FOREIGN PATENT DOCUMENTS

| | | |
|---|---|---|
| GB | 2398651 A | 8/2004 |
| GB | 2391083 B | 3/2006 |
| WO | 0250624 A3 | 6/2002 |

OTHER PUBLICATIONS

Rabideau, Daniel J., et al., "Simulated Annealing for Mapping DSP Algorithms onto Multiprocessors," Signals, Systems and Computers, 1993 Conference Record of the Twenty-Seventh Asilomar Conference, Nov. 1-3, 1993, IEEE, pp. 668-672.
Nanda, Ashwini K., et al., "Mapping Applications onto a Cache Coherent Multiprocessor," Conference on High Performance Networking and Computing, Proceedings of the 1992 ACM/IEEE Conference on Supercomputing, 1992, IEEE, pp. 368-377.
Lin, Liang-Yu, et al., Communication-driven Task Binding for Multiprocessor with Latency Insensitive Network-on-Chip, Design Automation Conference, 2005 Proceedings of the ASP-DAC, Jan. 18-21, 2005, IEEE, pp. 39-44.

* cited by examiner

*Primary Examiner* — Corey S Faherty
(74) *Attorney, Agent, or Firm* — Weide & Miller, Ltd.

(57) ABSTRACT

There is provided a method for placing a plurality of processes onto respective processor elements in a processor array, the method comprising (i) assigning each of the plurality of processes to a respective processor element to generate a first placement; (ii) evaluating a cost function for the first placement to determine an initial value for the cost function, the result of the evaluation of the cost function indicating the suitability of a placement, wherein the cost function comprises a bandwidth utilization of a bus interconnecting the processor elements in the processor array; (iii) reassigning one or more of the processes to respective different ones of the processor elements to generate a second placement; (iv) evaluating the cost function for the second placement to determine a modified value for the cost function; and (v) accepting or rejecting the reassignments of the one or more processes based on a comparison between the modified value and the initial value.

24 Claims, 4 Drawing Sheets

PROCESS PLACEMENT IN A PROCESSOR ARRAY

This application claims the benefit of priority from British Patent Application No. 0802530.6 filed in the United Kingdom on Feb. 11, 2008. The subject matter of this application is incorporated herein by reference.

TECHNICAL FIELD OF THE INVENTION

The invention relates to the placement of processes on processor elements in a processor array.

BACKGROUND TO THE INVENTION

Processor arrays that contain a number of separate but interconnected processor elements are known. One such processor array is the picoArray™ architecture produced by the applicant of the present application and described in International publication WO 02/50624. In the picoArray™ architecture, the processor elements are connected together by a proprietary bus that includes switch matrices.

The software description of a digital signal processing (DSP) system comprises a number of processes that communicate with point-to-point or point-to-multipoint signals. Each signal has a fixed bandwidth, known as its slot rate, which has a value that is a power of two in the range 2-1024, in units of the picoArray™ cycle. Thus, a slot rate of four means that slots must be allocated on the bus between a sending processor element and the receiving processor element(s) every four system clock cycles.

A partitioning procedure can be used to allocate groups of processes to each of the processor arrays in the system. A placement procedure can be used to allocate each process to a specific processor element within its allocated processor array. A switching or routing procedure determines the multiplexing of the signals on to the physical connections of the bus in the processor array.

The placement and switching procedure takes a user's abstract design, which consists of processes and signals, and places each process onto a processor element on a picoArray™ and routes all of the signals using the switching matrix of the picoArray™. This procedure must be carried out in a way that maximizes the number of processor elements that can be used within a given picoArray™ and that minimises the length of the routing needed for the signals.

The placement and the routing steps are generally performed separately, for example a candidate placement is created and then the signals are routed using that placement.

The output of the placement and switching procedure is a "load file" which contains configuration data for a single picoArray™.

The proprietary bus used in picoArrays™ is a time division multiplexed (TDM) structure in which communication timing is determined at "compile time". In other words, there is no dynamic arbitration.

The bus comprises a set of "switches" placed throughout the processor array, and these switches are either in-line with the processor elements (see FIG. 1(a)), or offset (see FIG. 1(b)).

In-line switches are easier to use for placement and routing algorithms since the regularity makes it easier to compute distances between processor elements. With offset switches, each row of processor elements is connected to two rows of switches, and therefore it is possible to communicate between adjacent rows by only traversing one switch, whereas in-line switches require the traversal of two switches.

However, for offset switches, each processor element is connected to two bus connections and only one of these can be used to provide this single switch transfer. If that direction becomes blocked (perhaps by another signal) then the other direction must be used, and this requires the traversal of three switches. For in-line switches, the two possible directions both require the traversal of two switches.

Thus, it is easier to predict "bus costs" before routing is actually performed if in-line switches are used.

The routing procedure (which takes place after the placement procedure) requires a tool that can determine the contents of routing tables within each of the switches that make up the picoBus structure from the signals that need to be routed. Each routing table consists of a set of entries that indicate the routing for each clock cycle. The set of entries are repeated every N clock cycles. In addition, it is possible for some of the entries to be repeated at a lower frequency to provide communications at lower rates, while reducing the size of routing tables that are required.

In currently available picoArrays™, N is 1024. This is implemented as a table of 124+(4×8) entries. The main part of the table, which comprises the 124 entries, is repeated once every 128 clock cycles. The 8 blocks of 4 entries are repeated every 1024 clock cycles and are known as the "hierarchical" entries.

The present application is concerned with a procedure for placing or allocating the processes to the processor elements. Therefore, it is assumed that any partitioning procedure has been carried out before the placement algorithm is started.

According to an aspect of the invention, there is provided a method for placing a plurality of processes onto respective processor elements in a processor array, the method comprising (i) assigning each of the plurality of processes to a respective processor element to generate a first placement; (ii) evaluating a cost function for the first placement to determine an initial value for the cost function, the result of the evaluation of the cost function indicating the suitability of a placement, wherein the cost function comprises a bandwidth utilization of a bus interconnecting the processor elements in the processor array; (iii) reassigning one or more of the processes to respective different ones of the processor elements to generate a second placement; (iv) evaluating the cost function for the second placement to determine a modified value for the cost function; and (v) accepting or rejecting the reassignments of the one or more processes based on a comparison between the modified value and the initial value.

BRIEF DESCRIPTION OF THE DRAWINGS

Preferred embodiments of the invention will now be described, by way of example only, with reference to the following Figures, in which.

DETAILED DESCRIPTION OF THE PREFERRED EMBODIMENTS

Although the invention will be described with reference to the picoArray™ processor array designed and manufactured by the applicant for this patent application, it will be appreciated that the invention is applicable to other types of multi-processor arrays.

The routing tables in each switch include three pieces of information for each signal. These are:
- the rate of transfer, R, required for the signal (currently this must be a power of 2 between 2 and 1024 inclusive);
- the offset (or phase) at which signals are routed; and
- the number of clock cycles, C, required to complete the transfer (this is determined by the length of the picoBus traversed).

For example, a signal with a rate of 4, an offset of 1 and number of clock cycles equal to 2 will occupy the bus on cycle 1, 2, 5, 6, 9, 10, 13, 14 etc. It will be noted here that each pair of entries provides a single communication, but in general, each communication requires C consecutive entries to be reserved in the table. For signals with rates between 2 and 128 inclusive, the offset can be anything from 0 to "rate-1". For a signal with a rate between 256 and 1024, the offsets are more limited since they must be stored in the "hierarchical" part of the routing table. In addition, the current implementation of the picoBus places a constraint on the value of C, namely that C must be less than R. For example, a signal with a rate of 2 will only permit a single cycle transfer.

Figure 1:
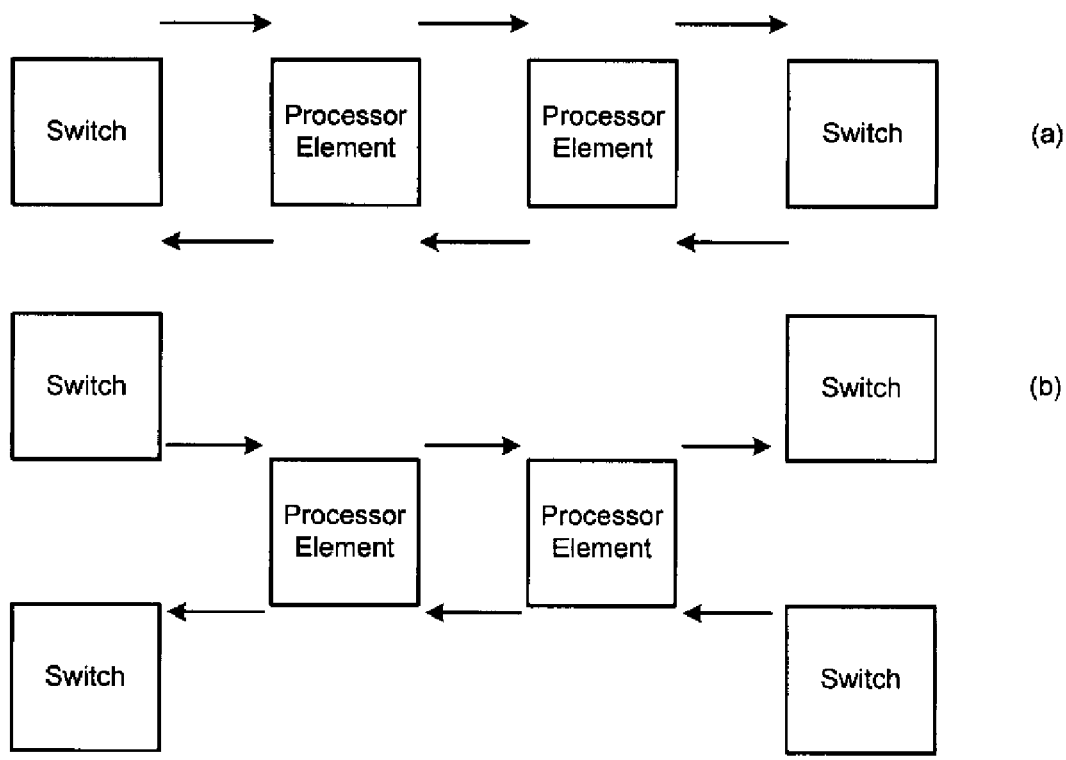
FIG. 1 shows bus switches in line with processor elements (FIG. 1(a)) and offset from the processor elements (FIG. 1(b))
Figure 2:
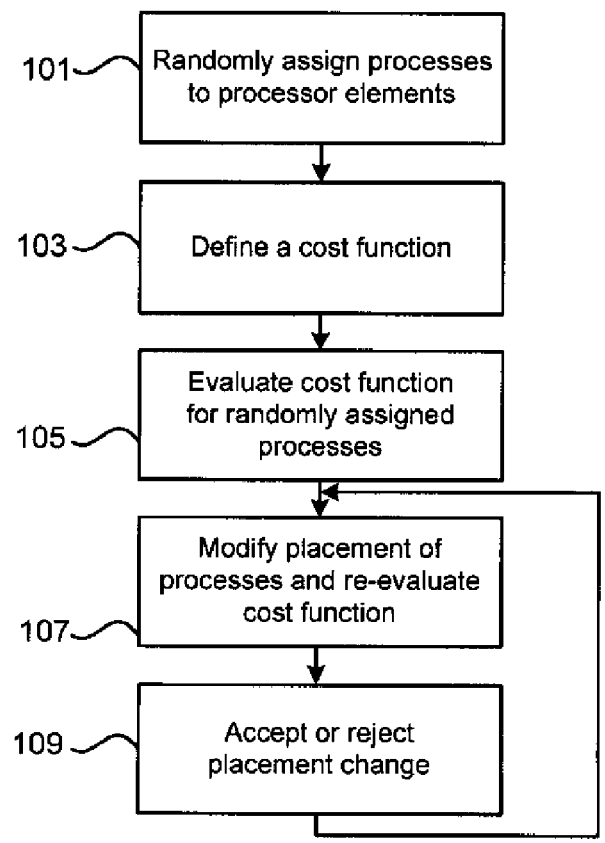
FIG. 2 is a flow chart illustrating a method in accordance with the invention.

The basic placement process according to the invention comprises a simulated annealing method in which a random initial placement is refined by altering the placement of processes within the processor array. An exemplary method is set out in FIG. 2.

In step 101, the processes are randomly allocated to the processor elements in the processor array. In some embodiments, this step can also comprise allocating specific processes to specific processor elements. These allocations can be as a result of a preference entered into the tool by the user, or by the type of process.

In step 103, a "cost" function is defined which is to be minimized (this indicates the suitability of a placement) and if a change in a placement produces a reduction in the cost function, then the change is accepted. In preferred embodiments, the cost function is defined for the entire processor array.

The cost function is evaluated for the random process placement to determine an initial value for the cost function (step 105).

The placement of a process is then modified (i.e. it is allocated to a different processor element) and the cost function is re-evaluated. If a change in the placement results in the cost function increasing, then the change is accepted, probabilistically dependent on a "temperature" (step 109). The temperature is initially set to be high in order to allow many changes to be accepted that increase the cost function, as this helps to avoid the placement algorithm finding local minima in the cost function.

The method then returns to step 107 and repeats for a modified placement. The iteration continues until there are no more improvements in the placement at a given "temperature". In preferred embodiments, the modification in the placement of processes is determined randomly.

In one embodiment of the invention, the cost function can be related to the overall bus bandwidth utilization. This can be calculated by summing the bus bandwidth for each signal, which is in turn calculated by summing the bus bandwidth used by each path of the signal to the individual destination processor elements (although this will generally overestimate the bus bandwidth due to shared signal paths being counted several times). For a given signal path from a source processor element to a destination processor element, the bus bandwidth, bw="slots" ... C ... "segments", where "slots" is the number of slots required, as determined by the rate of the signal; C is the number of clock cycles the signal must stay on the bus for each transfer; and "segments" is the number of bus segments traversed plus the number of switches traversed. The calculation of the segments can be weighted so that, for example, a switch traversal is deemed more expensive than a bus segment traversal. However, in a preferred embodiment, no weighting is used.

However, the overall bus bandwidth is not always an effective cost function given the local/global nature of the bus architecture. The local buses connect processor elements together in a given site group, and also allow them to connect to their local switches. In most cases, the terms "site" and processor element are interchangeable. However, they are not interchangeable for multisite processors (such as Control Processors that are described further below) that consist of two sites and straddle a switch. A "site group" is the collection of sites between a pair of switches. In current picoArrays, there are either one or four sites in a site group. However, in other types of array, there can be any number of sites in a site group.

In a preferred embodiment of the invention, the cost function is related to the overall bus bandwidth, as well as the site congestion and the site group congestion.

The evaluation of whether a given site is congested is performed by estimating the bus bandwidth used for all of the signals connected to the processor element, and comparing this to the available bandwidth.

The rate of each signal will be specified in the system (program) design, and so does not need to be estimated. However, the number of clock cycles required for each communication will only be known exactly after all signals have been routed, so this must be estimated.

The number of clock cycles required depends on the particular route that is taken from the source processor element to the destination processor element(s). Therefore, to perform this estimation, it is assumed that a route is taken that covers the minimum distance between the processing elements. A more detailed discussion of the determination of minimum distance routes can be found in United Kingdom Patent Application no. 0802531.4 entitled "Signal routing in processor arrays" filed in the United Kingdom on Feb. 11, 2008, which was also filed in the U.S. and issued as U.S. Pat. No. 8,077,623 on Dec. 13, 2011, the relevant parts of which are incorporated herein by reference.

The number of clock cycles can be calculated using silicon timing information, or it can be read from a sustain cache (described further below).

The overall bandwidth can then be calculated and compared with the maximum bandwidth allowed for the given site, and a congestion failure indicated when the bandwidth is more than the maximum.

For a processor array with signal routing repeated every N cycles and a signal with rate R requiring C clock cycles per communication, the bandwidth will be given by N*C/R. Therefore, a single clock cycle signal with a data rate of 2 (i.e. requiring a slot on the bus every 2 clock cycles) will require 512 of the available 1024 cycles on a single bus connection in current picoArrays™.

The site group for a given source processor element is defined as the collection of processor elements that can be reached from the source processor element on the bus without traversing a switch. For example, consider the processor array 2 in FIG. 3. Each site group consists of two processor elements (PEs).

In current picoArrays™, site groups consist of between one and four processor elements, although it will be appreciated that alternative processor arrays can have any number of processor elements in a site group.

For site group congestion, the feasibility of the routing for the group of processor elements must be considered. In addition, if the processor element has multiple connections to the bus, then an estimate of which connection will be used by each signal is required.

Figure 3:
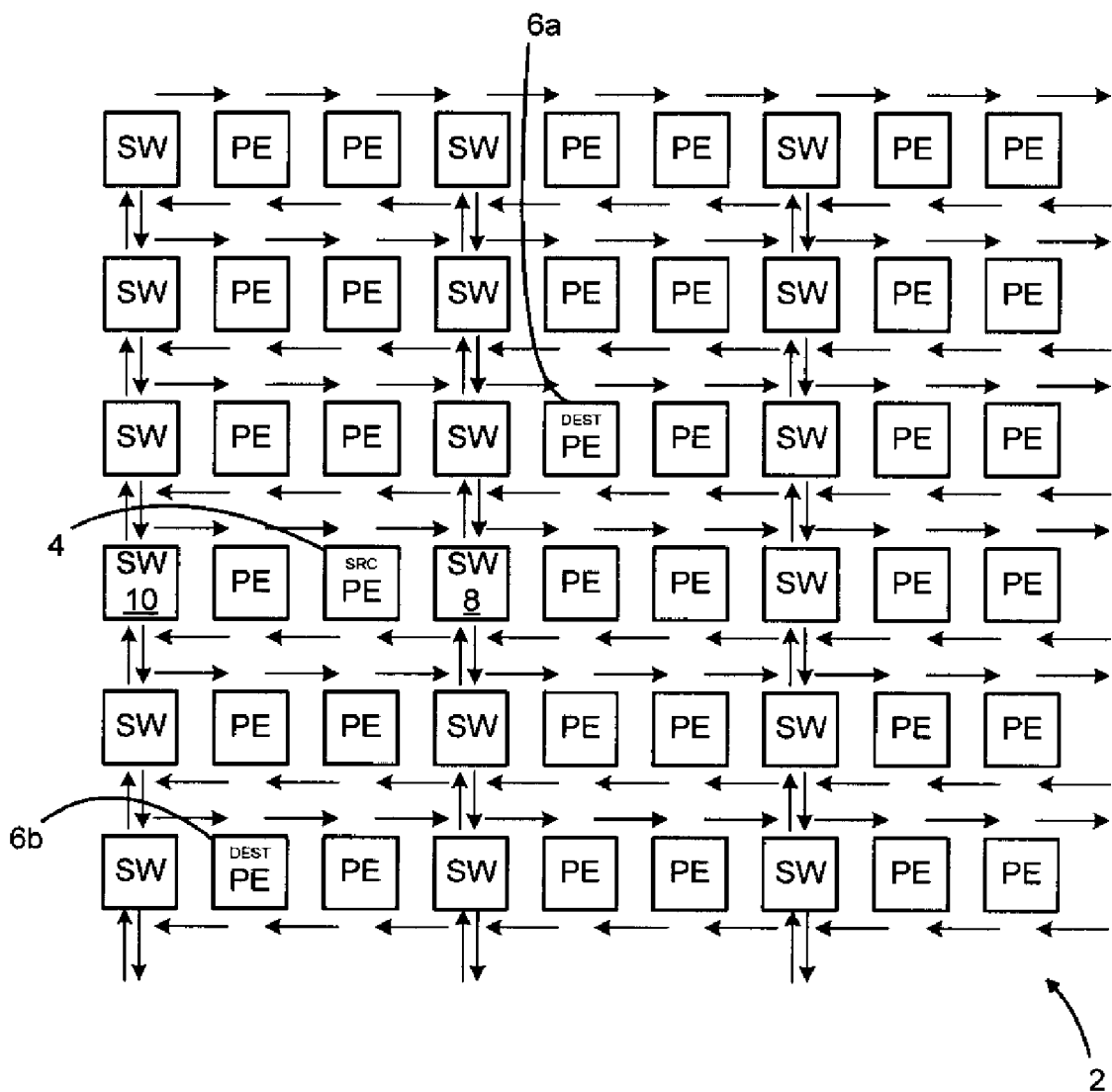
FIG. 3 is a block diagram illustrating an exemplary processor array.

In order to estimate which connection will be used, it is again assumed that the minimum distance route to the destination will be taken. FIG. 3 shows two signals from the source processor element 4 that are to be sent to a first destination processor element 6a and a second destination processor element 6b respectively. The signal to the first destination processor element 6a will be assumed to take the bus connection to the switch 8 immediately to the right of the source processor element 4. However, for the signal to the second destination processor element 6b, either the left or the right bus could be taken (i.e. via switch 8 or switch 10 respectively), so there are two minimum distance routes. In these situations, signals from a given processor element are assumed to be equally divided between the left and right buses.

Thus, for a given site group, all of the signals that are attached to any of the processor elements in the group must be considered. As with site congestion, the number of consecutive clock cycles required for transmission of each signal must be determined. From this and the data rate of the signals, the number of clock cycles required for each segment of the bus within the site group can be determined. The possibility that a signal or signals could be "point-to-multipoint" must also be taken into consideration in this calculation, since the same signal may appear to traverse the same bus segment multiple times. This duplication must be removed from the calculation.

For each bus segment, the required number of clock cycles is compared to the maximum allowed (for example 1024 clock cycles), and a congestion failure is indicated if the required number is more than the maximum.

Thus, the cost function is determined from a combination of the above three elements. In one embodiment, the cost function is a linear combination of these elements, but in other embodiments, non-linear combinations are possible.

Furthermore, the overall bus usage can be normalized by dividing the usage by the number of signals present in the design. In this way, this part of the cost function will not be dependent on the size of the design.

In addition, the weighting of the congestion elements can be changed as the algorithm progresses. Towards the end of the algorithm (i.e. as the cost function tends towards its minimum), the costs associated with the congestion need to be effectively binary in nature, i.e. if congestion is found then this is an absolute bar to achieving a solution, and it is therefore important that placement changes that produce congestion are always rejected in step 109. However, at the start of the algorithm, this is not the case as it may be necessary for congestion to be permitted in order to avoid a local minimum of the cost function.

Figure 4:
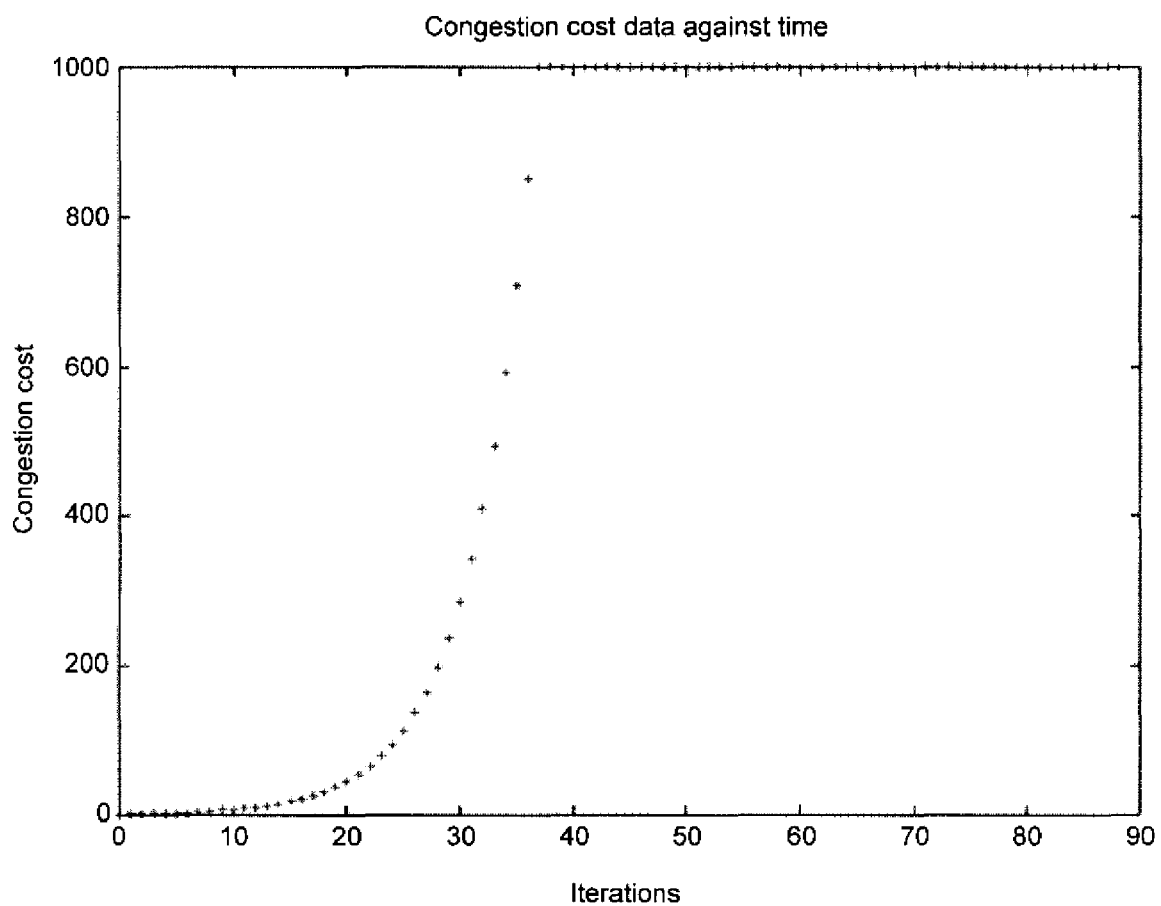
FIG. 4 is a graph showing an exemplary variation of congestion cost with the number of completed iterations.

An exemplary variation in the congestion weighting is represented as a graph in FIG. 4. Therefore, it can be seen that for the first few iterations of the algorithm (i.e. repetitions of steps 107 and 109), the congestion cost is zero or close to zero. However, as the number of iterations increases, the congestion cost tends to a value that ensures any placements with a particular level of congestion are rejected.

At any point in the method where a change in congestion weighting is made, the overall cost function must be re-evaluated in full to ensure that future relative comparisons of cost will be correct.

As calculation of the cost function is relatively computationally expensive, an incremental method can be used to calculate only the costs relating to those processor elements and signals that have been altered by a change in placement.

In this case, for each processor element whose placement has changed, the costs for the processor element that has moved, the signals connected to the processor element that has moved and all processor elements that are directly connected to those signals must be re-evaluated.

For those processor elements and signals that are affected by a change in placement, an 'old' and 'new' cost can be calculated and a difference between the two determined. This difference can be positive or negative depending on the change that has been made. If the difference is calculated as "new cost−old cost", a negative difference will always be accepted in step 109, whereas a positive difference will be accepted probabilistically.

The placement modification carried out in step 107 can be one of two types. The first type is the movement of a process from one processing element to another processing element that does not already have a process assigned thereto.

The second type involves swapping the processes on two compatible processor elements. In a picoArray™ processor array, processor elements can currently be placed on one of three types of site, known as "standard" (STAN), "memory" (MEM) or "control" (CTRL). The memory and control sites (or rather the processor elements placed thereon) share the same instructions set and register architecture, but have differing amounts of memory and hardware ports for connecting to the picoBus. The standard site (or rather the processor element placed thereon) has a different instruction set to the other two sites, a pair of accumulator registers and smaller amounts of memory and hardware ports. Furthermore, it is possible for a user to designate a processor element as being an "ANY", meaning that it can be placed in any of the three different site types.

As the MEM site type has a subset of the capabilities of the CTRL site type, MEM processes can therefore be placed on a CTRL site. Thus, two processor elements are compatible if the site types are the same, or if the process type on each processor element is suitable for placement on the other processor element.

In a preferred embodiment, the distance that processes on processor elements can be moved in the processor array during a change is reduced. This can be in addition to reducing the temperature of the simulated annealing as the placement algorithm progresses. This reduces the number of unproductive cost function evaluations that are performed during the algorithm, and therefore improves the overall performance of the placement and switching tool.

Figure 5:
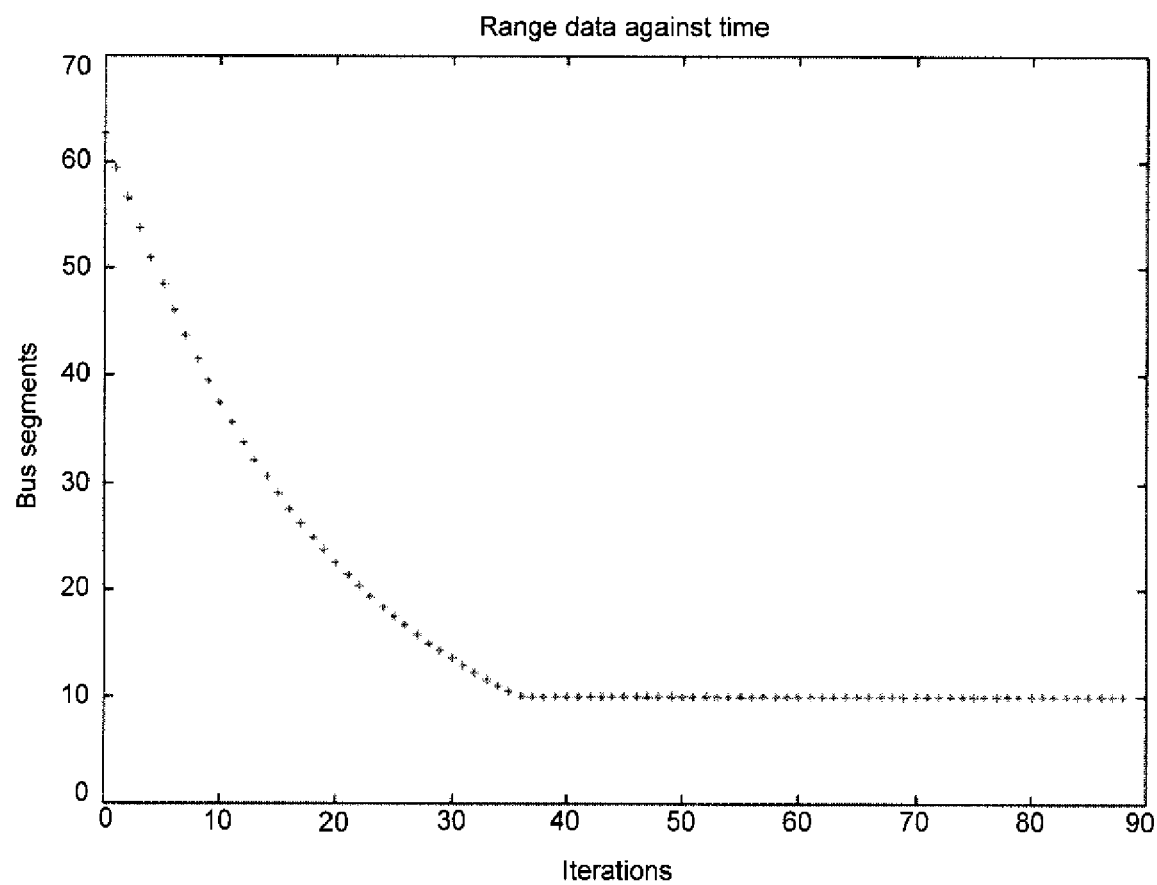
FIG. 5 is a graph showing an exemplary variation of maximum range with the number of completed iterations.

FIG. 5 illustrates an exemplary variation in the maximum distance that processes can be moved (in terms of bus segments) as the number of iterations performed by the algorithm increases. Thus, at the start of the algorithm, the maximum distance is set so that processes can be moved to any processor element in the processor array. Therefore, in the Figure, the maximum distance across the array will be equal to 60 bus segments. As the number of iterations increases, the maximum distance reduces to a "minimum" value for the maximum distance. The minimum value is chosen heuristically so that it equates to the distance that can be covered by a signal in a single clock cycle over the bus. In this example, the minimum is set to 10 bus segments.

Once the algorithm has been completed and placements have been found for all of the processes in the system, a routing algorithm can be carried out as described in the co-pending application mentioned above.

Although it is not possible to determine whether a given placement is routable without performing the full routing algorithm, simple checks, such as routing a signal between the two relevant processor elements in an otherwise empty processor array, can be carried out on completion of the placement algorithm to ensure that the algorithm has not produced obviously unroutable placements.

If a system includes multiple processor arrays, the placement algorithm is preferably performed separately for each processor array, although it is possible to perform the algorithm multiple times to place processes across the entire system (although the partitioning procedure described above must be performed first).

The tool that carries out the partitioning may also provide some pre-placement information where fixed "peripheral" blocks are involved, but this is not a requirement for this procedure to be used.

The timing of data communications within a processor array 2 is vital to the performance of the data transfer, and, due to the size of many processor arrays, it will not in general be possible to perform an arbitrary communication in a single clock cycle. Therefore, the signal must be "sustained" on the bus.

Consequently, the placement and routing tool needs to maintain an accurate representation of the array timing, and needs to be able to produce a timing representation of a signal using an arbitrary route between two arbitrary processor elements. This timing also needs to take into account the possibility of device redundancy (as described in UK Patent no. 2391083).

To overcome the speed penalty in performing the calculations of the time taken to traverse a route, the tool maintains a cache that stores predetermined values for the number of clock cycles required to transfer data between two processors. In a preferred embodiment, the sustain cache includes an entry for all possible source and destination processor element pairs, i.e. for a given source processor element, there is timing information on how long a signal takes to propagate to each other processor element in the array. Thus, for an array of N processor elements, there are N.(N−1) entries. In a preferred embodiment, the minimum number of clock cycles is stored, each corresponding to a minimum distance route between the processor elements. In alternative embodiments, further values can be cached for non-minimum distance routes.

When producing a load file for a design it will not be known whether the device that will be used will be a "perfect" device or a device that contains faults that must be handled using redundancy.

In the placement and routing tool, part of a processor array 2 (such as a row, column or site of processor elements) can be labelled as being redundant. This means that during the placement phase, processes will not be placed on these processor elements.

During routing of the signals, the possibility of processor elements being in different relative positions must be dealt with, and the worst case timing used for each signal. For example, when row redundancy is being used, the vertical distance between two processor elements is not known exactly since the redundant row may actually lie between the source processor element and the destination processor elements. To allow the rapid timing for each different type of device, i.e. perfect, row redundant, site redundant, it is necessary to have a separate sustain timing cache for each situation.

There is therefore described a procedure for placing or assigning processes to processor elements in a processor array.

Although the invention has been described in the form of a method or algorithm, it will be appreciated that the invention can be embodied as a computer program or as suitably programmed hardware.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A method for placing a plurality of processes onto respective processor elements in a processor array, the method comprising:
    (i) assigning each of the plurality of processes to a respective processor element to generate a first placement;
    (ii) evaluating a cost function for the first placement to determine an initial value for the cost function, the result of the evaluation of the cost function indicating the suitability of a placement, wherein the cost function comprises a bandwidth utilization of a bus interconnecting the processor elements in the processor array;
    (iii) reassigning one or more of the processes to respective different ones of the processor elements to generate a second placement;
    (iv) evaluating the cost function for the second placement to determine a modified value for the cost function; and
    (v) accepting or rejecting the reassignments of the one or more processes based on a comparison between the modified value and the initial value.

2. A method as claimed in claim 1, wherein, in the event that the reassignments of the one or more processes are accepted, performing steps (iii), (iv) and (v) on the second or a subsequent placement, wherein repeating step (v) comprises comparing the value for the cost function determined in repeating step (iv) to the value of the cost function for the previous placement.

3. A method as claimed in claim 1, wherein, in the event that the reassignments of the one or more processes are rejected, repeating steps (iii), (lv) and (v) on the first placement.

4. A method as claimed in claim 1, wherein the bandwidth utilization is evaluated by summing the bandwidth that will be used by each signal to be generated by the processes executing on their respective processor elements.

5. A method as claimed in claim 4, wherein the bandwidth utilization for each signal is given by:

bandwidth=slots*C*segments;

where "slots" is the number of slots required by the signal on the bus, "C" is the number of clock cycles of the processor array that the signal must stay on the bus for, and "segments" is a number of bus segments traversed by the signal plus a number of switches traversed by the signal.

6. A method as claimed in claim 4, wherein the cost function comprises a combination of the bandwidth utilization of the bus and one or both of site congestion and site group congestion, where the site congestion for a given site is an estimation of the bandwidth used for all signals connected to the processor element associated with the site, and the site group congestion is an estimation of the bandwidth used for all signals connected to the processor elements in the site group.

7. A method as claimed in claim 6, wherein the combination is a linear combination.

8. A method as claimed in claim 6, wherein the relative weightings of the bus bandwidth utilization, site congestion and site group congestion in the combination are modified as steps (iii), (iv) and (v) are repeated.

9. A method as claimed in claim 8, wherein the relative weightings are modified so that the site congestion and site group congestion are increased relative to the bus bandwidth utilization as steps (iii), (iv) and (v) are repeated.

10. A method as claimed in claim 1, wherein step (iii) comprises reassigning the one or more of the processes to respective different ones of the processor elements to generate a second placement such that each of the respective different ones of the processor elements are equal to or less than a maximum permitted distance from their respective processor elements in the first placement.

11. A method as claimed in claim 10, wherein the maximum permitted distance is decreased as steps (iii), (iv) and (v) are repeated.

12. A method as claimed in claim 1, wherein step (iv) comprises evaluating that part of the cost function associated with the one or more processes that have been reassigned in step (iii).

13. A method as claimed in claim 1, wherein placements with low values for the cost function are more suitable than placements with higher values.

14. A method as claimed in claim 13, wherein step (v) comprises accepting the reassignments of the one or more processes if the modified value is less than the value for the previous placement.

15. A method as claimed in claim 13, wherein step (v) comprises accepting the reassignments of the one or more processes if the modified value is greater than the value for the previous placement by less than a variable threshold.

16. A method as claimed in claim 15, wherein the variable threshold is decreased each time as steps (iii), (iv) and (v) are repeated.

17. A method as claimed in claim 1, wherein step (iii) comprises reassigning one of the processes to a different processor element.

18. A method as claimed in claim 1, wherein step (iii) comprises swapping the processes assigned to two of the processor elements in the processor array.

19. A method as claimed in claim 1, wherein step (i) comprises randomly assigning each of the plurality of processes to a respective processor element.

20. A method as claimed in claim 1, wherein step (iii) comprises randomly reassigning the one or more processes to respective different ones of the processor elements.

21. A method as claimed in claim 1, wherein step (i) comprises assigning one or more of the plurality of processes to specified processor elements, and randomly assigning the remaining ones of the plurality of processes to processor elements in the processor array.

22. A method as claimed in claim 21, wherein step (iii) comprises randomly reassigning one or more of the remaining ones of the plurality of processes to different ones of the processor elements.

23. A system for placing a plurality of processes onto respective processor elements in a processor array comprising:
  a processor configured to execute software code;
  a memory, accessible by the processor, the memory configured with non-transitory software code configured to:
  (i) assigning each of the plurality of processes to a respective processor element to generate a first placement;
  (ii) evaluating a cost function for the first placement to determine an initial value for the cost function, the result of the evaluation of the cost function indicating the suitability of a placement, wherein the cost function comprises a bandwidth utilization of a bus interconnecting the processor elements in the processor array;
  (iii) reassigning one or more of the processes to respective different ones of the processor elements to generate a second placement;
  (iv) evaluating the cost function for the second placement to determine a modified value for the cost function; and
  (v) accepting or rejecting the reassignments of the one or more processes based on a comparison between the modified value and the initial value.

24. A non-transitory computer readable medium containing program instructions for placing a plurality of processes onto respective processor elements in a processor array, wherein execution of the program instructions by one or more processors to carry out the steps of:
  (i) assigning each of the plurality of processes to a respective processor element to generate a first placement;
  (ii) evaluating a cost function for the first placement to determine an initial value for the cost function, the result of the evaluation of the cost function indicating the suitability of a placement, wherein the cost function comprises a bandwidth utilization of a bus interconnecting the processor elements in the processor array;
  (iii) reassigning one or more of the processes to respective different ones of the processor elements to generate a second placement;
  (iv) evaluating the cost function for the second placement to determine a modified value for the cost function; and
  (v) accepting or rejecting the reassignments of the one or more processes based on a comparison between the modified value and the initial value.

* * * * *